United States Patent
Levy et al.

(10) Patent No.: US 10,057,357 B2
(45) Date of Patent: Aug. 21, 2018

(54) SUPPORT FOR HIDDEN SSID IN DMG NETWORKS

(71) Applicant: Intel IP Corporation, Santa Clara, CA (US)

(72) Inventors: Elad Levy, Nes Ziona (IL); Solomon B. Trainin, Haifa (IL); Oren Kedem, Modiin Maccabim-Reut (IL); Idan Maor, Tel Aviv (IL)

(73) Assignee: Intel IP Corporation, Santa Clara, CA (US)

( * ) Notice: Subject to any disclaimer, the term of this patent is extended or adjusted under 35 U.S.C. 154(b) by 107 days.

(21) Appl. No.: 15/087,389

(22) Filed: Mar. 31, 2016

(65) Prior Publication Data
US 2017/0289274 A1 Oct. 5, 2017

(51) Int. Cl.
| H04J 1/16 | (2006.01) |
| H04L 1/00 | (2006.01) |
| H04L 12/16 | (2006.01) |
| H04L 29/08 | (2006.01) |
| H04W 48/16 | (2009.01) |
| H04W 8/00 | (2009.01) |
| H04W 84/12 | (2009.01) |

(52) U.S. Cl.
CPC .......... *H04L 67/16* (2013.01); *H04W 48/16* (2013.01); *H04W 8/005* (2013.01); *H04W 84/12* (2013.01)

(58) Field of Classification Search
CPC ...... H04L 67/16; H04W 48/16; H04W 8/005; H04W 84/12
See application file for complete search history.

(56) References Cited

U.S. PATENT DOCUMENTS

| 2006/0280128 A1* | 12/2006 | Abdel-Kader | ........... G01D 7/08 370/254 |
| 2008/0082543 A1* | 4/2008 | Abhishek | .............. H04W 48/18 |
| 2009/0207758 A1 | 8/2009 | Jeong et al. | |
| 2011/0154039 A1* | 6/2011 | Liu | ........................ H04L 63/061 713/170 |
| 2013/0176956 A1* | 7/2013 | Yamamoto | .......... H04W 76/021 370/329 |

(Continued)

FOREIGN PATENT DOCUMENTS

| WO | WO-2013062586 A1 | 5/2013 |
| WO | WO-2015068993 A1 | 5/2015 |
| WO | WO-2015069090 A1 | 5/2015 |

(Continued)

OTHER PUBLICATIONS

"International Application Serial No. PCT/US2017/019945, International Search Report dated Jun. 15, 2017", 3 pgs.

(Continued)

*Primary Examiner* — Maharishi V Khirodhar
(74) *Attorney, Agent, or Firm* — Schwegman Lundberg & Woessner, P.A.

(57) ABSTRACT

Described herein are methods and devices to provide support for a hidden SSID in an 802.11ad or directional multi-gigabit (DMG) wireless network. An access point (AP) of the DMG network may be configured to explicitly signal the hidden SSID configuration by sending probe responses that signal the hidden SSID configuration and/or signaling the hidden SSID configuration in DMG beacons transmitted by the AP.

15 Claims, 4 Drawing Sheets

(56) References Cited

U.S. PATENT DOCUMENTS

2013/0329712 A1* 12/2013 Cordeiro .............. H04B 7/0617
370/338
2017/0105143 A1* 4/2017 Seok ..................... H04W 28/06

FOREIGN PATENT DOCUMENTS

WO    WO 2016041363 A1 *   3/2016   ........... H04W 12/00
WO    WO-2016041363 A1    3/2016

OTHER PUBLICATIONS

"International Application Serial No. PCT/US2017/019945, Written Opinion dated Jun. 15, 2017", 6 pgs.
Adrian, Stephens, et al., "Some LB199 proposed resolutions", IEEE P802.II Wireless, LANs, doc.: IEEE 802.II-13/1314rl7, (Mar. 12, 2014), 1-69.

* cited by examiner

SUPPORT FOR HIDDEN SSID IN DMG NETWORKS

TECHNICAL FIELD

Embodiments described herein relate generally to wireless networks and communications systems.

BACKGROUND

Wireless networks as defined by the IEEE 802.11 specifications prior to the 802.11ad standard provide a means to help secure a wireless network by hiding the service set identification (SSID) of the network that is otherwise transmitted by access points (APs) of the network in beacon frames. Unless a device receiving the beacons knows the hidden SSID, it is unable to associate to the AP. Applying this same mechanism to 802.11ad networks, however, is problematic. Providing support for a hidden SSID in an 802.11ad network is the primary concern of the present disclosure.

DETAILED DESCRIPTION

Figure 1:
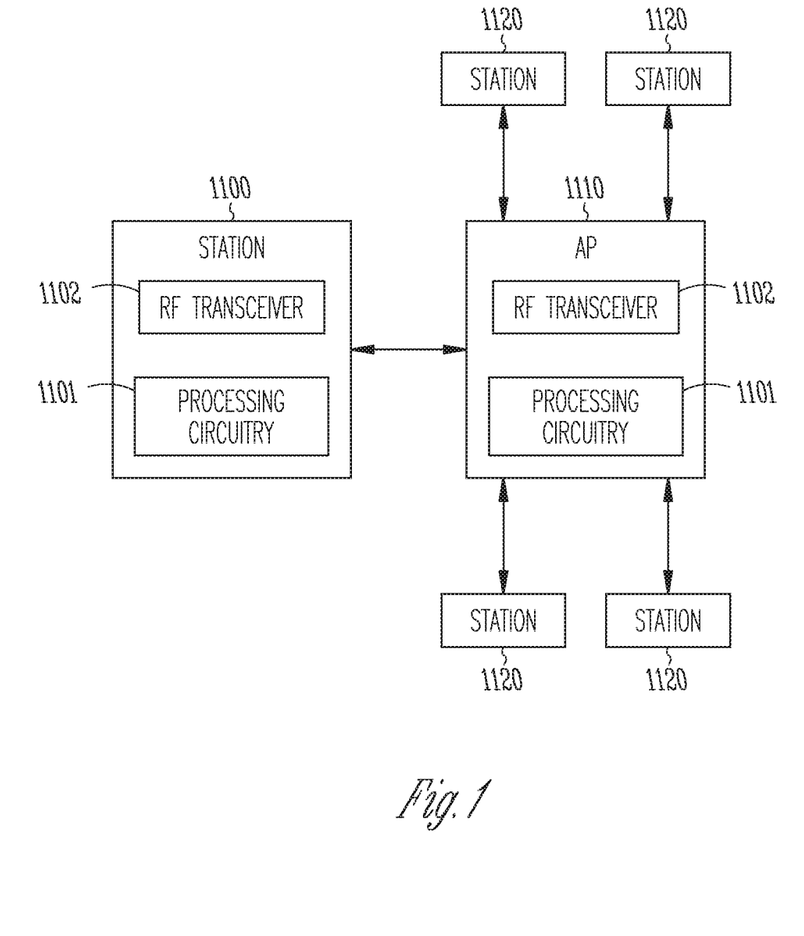
FIG. 1 illustrates a basic service set that includes a station device associated with an access point according to some embodiments.

In an 802.11 local area network (LAN), the entities that wirelessly communicate are referred to as stations (STAs). A basic service set (BSS) refers to a plurality of stations that remain within a certain coverage area and form some sort of association and is identified by the SSID of the BSS. In one form of association, the stations communicate directly with one another in an ad-hoc network. More typically, however, the stations associate with a central station dedicated to managing the BSS and referred to as an access point (AP). FIG. 1 illustrates a BSS that includes a station device 1100 associated with an access point (AP) 1110, where the AP 1110 may be associated with a number of other stations 1120. The device 1100 may be any type of device with functionality for connecting to a WiFi network such as a computer, smart phone, or a UE (user equipment) with WLAN access capability, the latter referring to terminals in a LTE (Long Term Evolution) network. Each of the station devices include an RF (radio frequency transceiver) 1102 and processing circuitry 1101 as shown by the depictions of devices 1100 and 1110. The processing circuitry includes the functionalities for WiFi network access via the RF transceiver as well as functionalities for processing as described herein. The RF transceivers 1102 of the station device 1100 and access point 1110 may each incorporate one or more antennas. The RF transceiver 1100 with multiple antennas and processing circuitry 1101 may implement one or more MIMO (multi-input multi-output) techniques such as spatial multiplexing, transmit/receive diversity and beam forming. The devices 1100 and 1110 are representative of the wireless access points and stations described below.

In an 802.11 WLAN network, the stations communicate via a layered protocol that includes a physical layer (PHY) and a medium access control (MAC) layer. The MAC layer is a set of rules that determine how to access the medium in order to send and receive data, and the details of transmission and reception are left to the PHY layer. At the MAC layer, transmissions in an 802.11 network are in the form of MAC frames of which there are three main types: data frames, control frames, and management frames. Data frames carry data from station to station. Control frames, such as request-to-send (RTS) and clear-to-send (CTS) frames are used in conjunction with data frames deliver data reliably from station to station. Management frames are used to perform network management functions. Management frames include beacon frames which are transmitted periodically by the AP at defined beacon intervals and which contain information about the network and also indicate whether the AP has buffered data which is addressed to a particular station or stations. Other management frames include probe request frames sent by a station probing for the existence of a nearby AP and probe response frames sent by an AP in response to a probe request frame.

The core feature of IEEE 802.11ad is a directional multi-gigabit (DMG) physical layer with gigabit-per-second data transfer capabilities achieved by multiple-antenna beam-forming in the 60 GHz spectrum. In IEEE 802.11 networks operating in lower frequency bands, access to the medium is organized By periodically reoccurring beacon intervals (BIs) that are initiated by a single beacon frame transmitted omnidirectionally by the AP. The beacon announces the existence of the wireless network served by the AP and also carries management data. The rest of the BI is used for data transmissions between stations, usually following a contention-based access scheme. The IEEE 802.11ad standard extends this concept to deal with the problems of mm-wave propagation at 60 GHz. In 802.11ad, a beacon interval is initiated with a beacon header interval (BHI) that replaces the single beacon frame of legacy 802.11 networks. The BHI enables the exchange of management information and network announcements using a sweep of multiple directionally transmitted frames. The BHI sweeping mechanism overcomes increased attenuation and unknown direction of unassociated devices. The BHI is followed by a Data Transmission Interval (DTI), which can implement different types of medium access. Medium access parameters necessary for stations to participate in a BI are transmitted by the AP during the BHI.

Figures 2, 3:
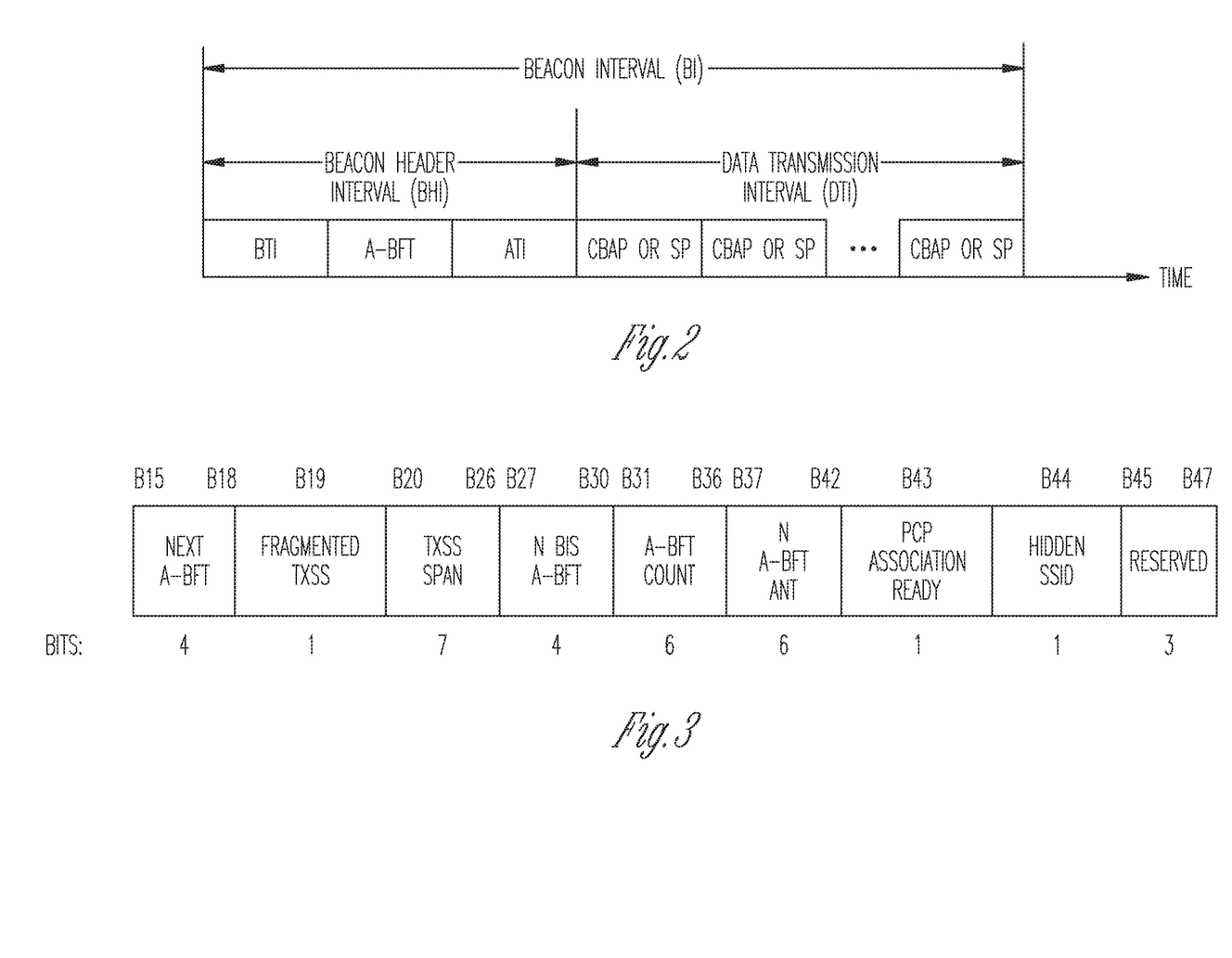
FIG. 2 illustrates a DMG beacon interval according to some embodiments.
FIG. 3 illustrates a control field of a DMG beacon frame according to some embodiments.

An example of an 802.11ad beacon interval, consisting of a BHI and a DTI, is shown in FIG. 2. The BHI consists of up to three sub-intervals: a beacon transmission interval (BTI), an association beamforming training (A-BFT) interval, and an announcement transmission interval (ATI). The BTI may contain multiple beacon frames, each transmitted by the AP on a different sector to cover all possible directions, and is used for network announcement and beamforming training of the AP's antenna sectors. The A-BFT interval is used by stations to train their antenna sector for communication with the AP. During the A-BFT interval, stations may exchange a series of sector sweep (SSW) frames over different antenna sectors to find the one that provides the best signal quality. During the ATI, AP exchanges management information with associated and beam-trained stations. For example, probe request and probe response frames may be exchanged with unassociated but beam-trained station during the ATI which is more efficient. Finally, the DTI contains of one or more contention-based access periods (CBAPs) and scheduled service periods (SPs) where stations exchange data frames.

Traditional 802.11 networks have a hidden SSID feature that may be used to help prevent an un-authorized STA from connecting to the network. An 802.11 network operating in non-DMG bands (i.e, non-802.11ad) implements a hidden SSID in the following manner. An Access point (AP) is identified as hidden by the lack of an SSID information element (IE) in beacons transmitted by the AP. A non-hidden AP, on the other hand, does include the SSID IE in its beacons. This way, only a STA that was previously provisioned to a network with a hidden SSID, and therefore knows the SSID in advance, can acquire the networks parameters with a probe request and associate to the network. For a STA performing active scanning without being pre-provisioned, a probe request sent to AP without the specific SSID being specified is not answered with a probe response.

An AP operating on a DMG band configured with hidden SSID could exhibit inconsistent behavior if it were to operate as described above with respect to traditional 802.11 networks. The SSID is an optional attribute in DMG beacons so the lack of an SSID in a DMG beacon cannot indicate a hidden AP. An AP will also complete initial beam forming (IBF) with any STA as the AP cannot distinguish an authorized STA from non-authorized STA at the time of IBF (i.e., no probe requests and responses are exchanged). The IBF will either be over the AP-allocated BTI+A-BFT (i.e., passive scanning) or as a response to STA-sent beacons in discovery mode with DM set to 1 (i.e., active scanning). After completion of the IBF, an AP's response to a probe request containing a wildcard SSID from the STA is not defined. Ignoring the probe request such as is done for non-DMG networks is problematic under DMG for several reasons.

A probe request is sent as a unicast frame to a known AP which is in range, and hence it is expected to be answered. A non-DMG probe request, on the other hand, is sent as a broadcast frame by the STA with no strict expectation of getting a response).

In the case of active scanning, the 802.11ad specification requires probe exchange after IBF is completed. In addition, the lack of a probe response from the AP could negatively impact power and performance during scanning as the STA might continue with probe request retries leading to additional power consumption and longer discovery time.

To overcome the problems described above, an AP operating in a DMG network may be configured to explicitly signal the hidden SSID configuration. In one embodiment, a probe response is defined with content that signals the hidden SSID configuration. Under this option, the STA is informed that this network is hidden stops initiating the probe request if the SSID is unknown. In another embodiment, the hidden SSID configuration is stated in DMG beacons transmitted by the AP. Under this option, a STA that desires to connect to an AP is expected to indicate the specific SSID in its probe request.

In one embodiment, the hidden SSID feature in a DMG infrastructure BSS is supported as follows. The DMG beacon includes a flag signaling the SSID is hidden. The flag can be included in one of the mandatory beacon fields (i.e., non-IE) or included as separate IE in the beacon frame body. In the case of a hidden network, the DMG beacon would not carry the SSID IE. This method supports a STA performing passive scanning and attempting to receive a DMG beacon frame from the AP. Once such a beacon frame received, if the STA is not configured with the hidden SSID value, it is does not attempt to respond on those beacons and may even not complete initial BF flow. If the STA is configured with the hidden SSID, on the other hand, it is configured to attempt to complete the initial BF and then send a probe request with the SSID value equal to the known SSID. For example the flag indicating SSID is hidden can be included in the beacon control field as shown by FIG. 3 in bit 44 (shortening the existing reserved field from 4-bit to 3-bit) In another embodiment, a new IE type is defined and included within the DMG beacon frame as an optional IE.

In another embodiment, an AP is mandated to respond to all probe requests with a probe response. This method supports a STA performing active scanning and attempting to send DMG beacons with DM=1 to the AP. Once such beacons are answered by SSW over A-BFT and the initial BF is complete, the STA shall send a probe request frame to the AP. If the STA is not configured with the hidden SSID value, the STA sends a probe request carrying a predefined wildcard SSID. The AP then responds with a probe response carrying the wildcard SSID as well to signal that the SSID is hidden and that the STA should not attempt to associate with this AP. Another option is to include in the probe response the same hidden SSID flag defined for beacons. If the STA is configured with the hidden SSID, on the other hand, it includes this SSID value within its probe request. The AP then answers with a probe response that includes the configured SSID to indicate to the STA that it should continue with network association to the AP.

Example UE Description

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 4:
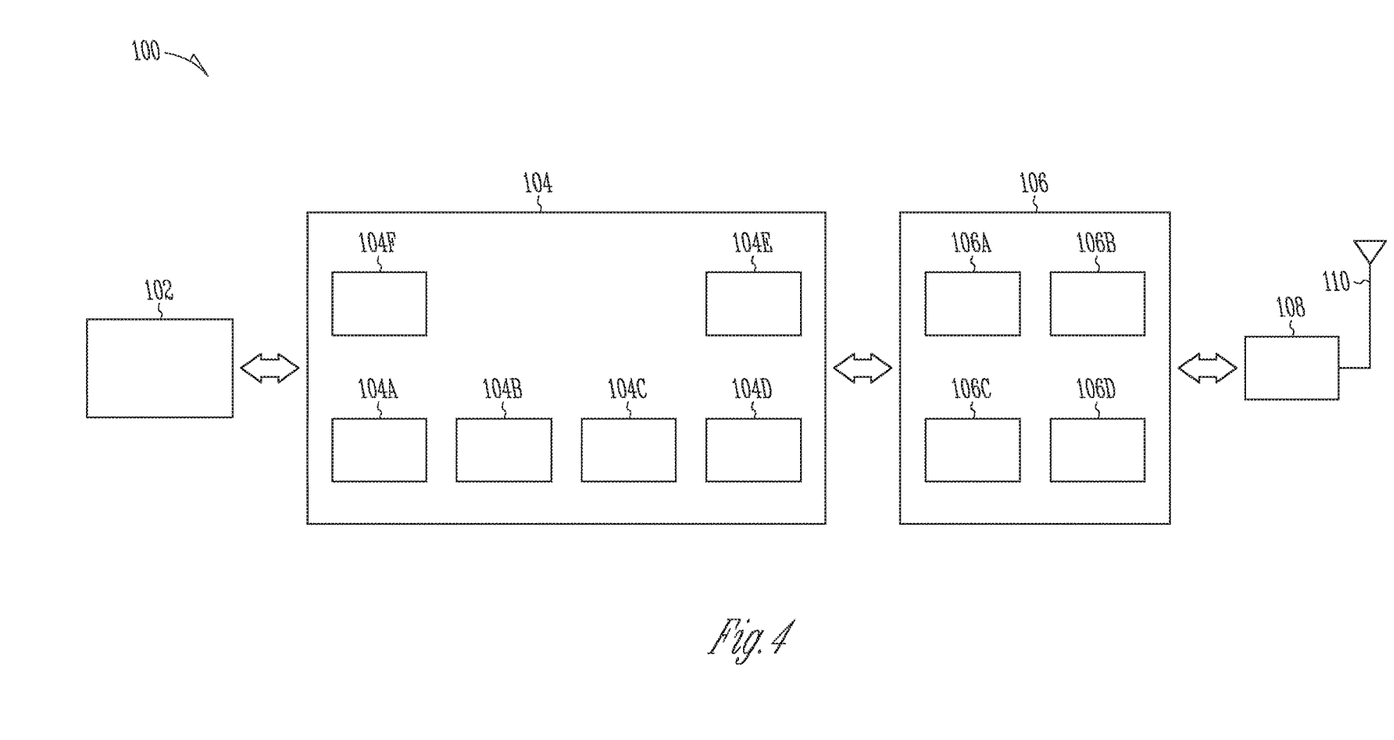
FIG. 4 illustrates an example of a user equipment device according to some embodiments.

Embodiments described herein may be implemented into a system using any suitably configured hardware and/or software. FIG. 4 illustrates, for one embodiment, example components of a User Equipment (UE) device 100. In some embodiments, the UE device 100 may include application circuitry 102, baseband circuitry 104, Radio Frequency (RF) circuitry 106, front-end module (FEM) circuitry 108 and one or more antennas 110, coupled together at least as shown.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuitry 104 may interface with the application circuitry 102 for generation and processing of the baseband signals and for controlling operations of the RF circuitry 106. For example, in some embodiments, the baseband circuitry 104 may include a second generation (2G) baseband processor 104*a*, third generation (3G) baseband processor 104*b*, fourth generation (4G) baseband processor 104*c*, and/or other baseband processor(s) 104*d* for other existing generations, generations in development or to be developed in the future (e.g., fifth generation (5G), 6G, etc.). The baseband circuitry 104 (e.g., one or more of baseband processors 104*a-d*) may handle various radio control functions that enable communication with one or more radio networks via the RF circuitry 106. The radio control functions may include, but are not limited to, signal modulation/demodulation, encoding/decoding, radio frequency shifting, etc. In some embodiments, modulation/demodulation circuitry of the baseband circuitry 104 may include Fast-Fourier Transform (FFT), precoding, and/or constellation mapping/demapping functionality. In some embodiments, encoding/decoding circuitry of the baseband circuitry 104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104*e* of the baseband circuitry 104 may be configured to run elements of the protocol stack for signaling of the PHY, MAC, RLC, PDCP and/or RRC layers. In some embodiments, the baseband circuitry may include one or more audio digital signal processor(s) (DSP) 104*f*. The audio DSP(s) 104*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 104 and the application circuitry 102 may be implemented together such as, for example, on a system on a chip (SOC).

In some embodiments, the baseband circuitry 104 may provide for communication compatible with one or more radio technologies. For example, in some embodiments, the baseband circuitry 104 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RF circuitry 106 may also include a transmit signal path which may include circuitry to up-convert baseband signals provided by the baseband circuitry 104 and provide RF output signals to the FEM circuitry 108 for transmission.

In some embodiments, the RF circuitry 106 may include a receive signal path and a transmit signal path. The receive signal path of the RF circuitry 106 may include mixer circuitry 106*a*, amplifier circuitry 106*b* and filter circuitry 106*c*. The transmit signal path of the RF circuitry 106 may include filter circuitry 106*c* and mixer circuitry 106*a*. RF circuitry 106 may also include synthesizer circuitry 106*d* for synthesizing a frequency for use by the mixer circuitry 106*a* of the receive signal path and the transmit signal path. In some embodiments, the mixer circuitry 106*a* of the receive signal path may be configured to down-convert RF signals received from the FEM circuitry 108 based on the synthesized frequency provided by synthesizer circuitry 106*d*. The amplifier circuitry 106*b* may be configured to amplify the down-converted signals and the filter circuitry 106*c* may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106*a* of the receive signal path may comprise passive mixers, although the scope of the embodiments is not limited in this respect.

In some embodiments, the mixer circuitry 106*a* of the transmit signal path may be configured to up-convert input baseband signals based on the synthesized frequency provided by the synthesizer circuitry 106*d* to generate RF output signals for the FEM circuitry 108. The baseband signals may be provided by the baseband circuitry 104 and may be filtered by filter circuitry 106*c*. The filter circuitry 106*c* may include a low-pass filter (LPF), although the scope of the embodiments is not limited in this respect.

In some embodiments, the mixer circuitry 106*a* of the receive signal path and the mixer circuitry 106*a* of the transmit signal path may include two or more mixers and may be arranged for quadrature downconversion and/or upconversion respectively. In some embodiments, the mixer circuitry 106*a* of the receive signal path and the mixer circuitry 106*a* of the transmit signal path may include two or more mixers and may be arranged for image rejection (e.g., Hartley image rejection). In some embodiments, the mixer circuitry 106*a* of the receive signal path and the mixer circuitry 106*a* may be arranged for direct downconversion and/or direct upconversion, respectively. In some embodiments, the mixer circuitry 106*a* of the receive signal path and the mixer circuitry 106*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode embodiments, a separate radio IC circuitry may be provided for processing signals for each spectrum, although the scope of the embodiments is not limited in this respect.

In some embodiments, the synthesizer circuitry 106d may be a fractional-N synthesizer or a fractional N/N+1 synthesizer, although the scope of the embodiments is not limited in this respect as other types of frequency synthesizers may be suitable. For example, synthesizer circuitry 106d may be a delta-sigma synthesizer, a frequency multiplier, or a synthesizer comprising a phase-locked loop with a frequency divider.

The synthesizer circuitry 106d may be configured to synthesize an output frequency for use by the mixer circuitry 106a of the RF circuitry 106 based on a frequency input and a divider control input. In some embodiments, the synthesizer circuitry 106d may be a fractional N/N+1 synthesizer.

In some embodiments, frequency input may be provided by a voltage controlled oscillator (VCO), although that is not a requirement. Divider control input may be provided by either the baseband circuitry 104 or the applications processor 102 depending on the desired output frequency. In some embodiments, a divider control input (e.g., N) may be determined from a look-up table based on a channel indicated by the applications processor 102.

Synthesizer circuitry 106d of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RF circuitry 106 for transmission by one or more of the one or more antennas 110.

In some embodiments, the FEM circuitry 108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110.

In some embodiments, the UE device 100 may include additional elements such as, for example, memory/storage, display, camera, sensor, and/or input/output (I/O) interface.

Example Machine Description

Figure 5:
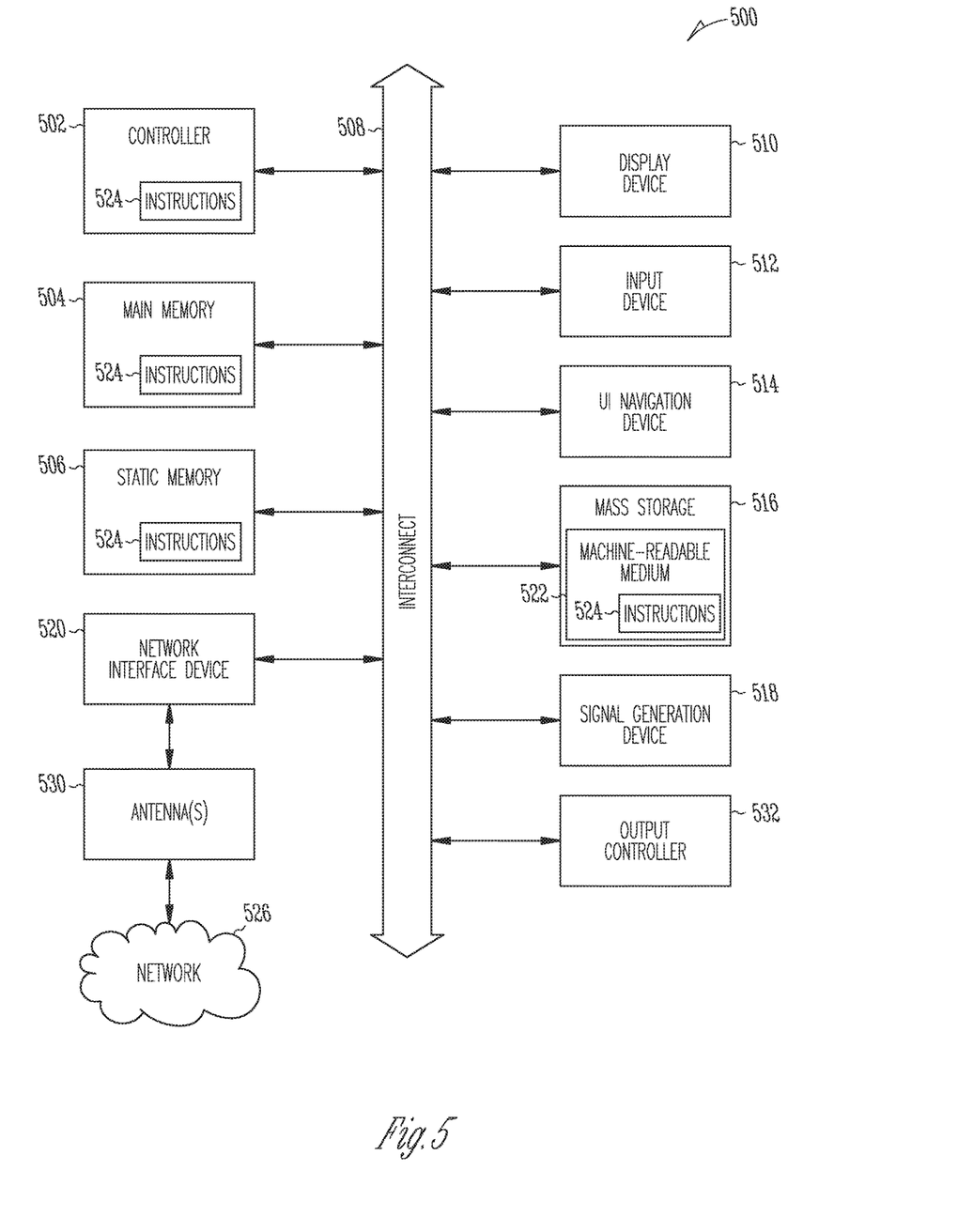
FIG. 5 illustrates an example of a computing machine according to some embodiments.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a user equipment (UE), evolved Node B (eNB), Wi-Fi access point (AP), Wi-Fi station (STA), personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques. The term "transmission medium" shall be taken to include any intangible medium that is capable of storing, encoding or carrying instructions for execution by the machine 500, and includes digital or analog communications signals or other intangible medium to facilitate communication of such software.

Additional Notes and Examples

In Example 1, apparatus for a wireless station device, comprises: memory and processing circuitry to configure the device to communicate with other station devices over a directional multi-gigabit (DMG) band in a wireless network; wherein the processing circuitry is to: encode DMG beacons to send other station devices (STAs) at periodic beacon intervals (BIs), wherein the DMG beacons do not include a service set identification (SSID) for the wireless network but do include an indication that the SSID is hidden; and, respond to a probe request sent by a STA with a probe response if the probe request includes the SSID of the wireless network and not respond to the probe request if it does not include the SSID of the wireless network.

In Example 2, the subject matter of any of the Examples herein may further include wherein the indication that the SSID is hidden is contained in an information element (IE) of the DMG beacon.

In Example 3, the subject matter of any of the Examples herein may further include wherein the indication that the SSID is hidden is contained in a control field of the DMG beacon.

In Example 4, the subject matter of any of the Examples herein may further include wherein the processing circuitry is to: configure the device to receive a DMG beacon in discovery mode transmitted by a STA that is actively scanning; and, after responding to the DMG beacon during the association beamforming training (A-BFT) interval of the BI, receive a probe request from the STA that is actively scanning.

In Example 5, the subject matter of any of the Examples herein may further include wherein the processing circuitry is configure the device to, if the probe request sent by the actively scanning STA contains a wildcard SSID, respond with a probe response that also contains the wildcard SSID to signal to the actively scanning STA that it should discontinue attempting to associate with the wireless network.

In Example 6, the subject matter of any of the Examples herein may further include wherein the processing circuitry is to, if the probe request sent by the actively scanning STA contains a wildcard SSID, respond with a probe response containing an indication that the SSID is hidden to signal to the actively scanning STA that it should discontinue attempting to associate with the wireless network.

In Example 7, the subject matter of any of the Examples herein may further include wherein the processing circuitry is to, if the probe request sent by the actively scanning STA contains the hidden SSID, respond with a probe response that signals to the actively scanning STA that it should continue attempting to associate with the wireless network.

In Example 8, the subject matter of any of the Examples herein may further include wherein the processing circuitry is to, if the probe request sent by the actively scanning STA contains the hidden SSID, respond with a probe response that also contains the hidden SSID to signal to the actively scanning STA that it should continue attempting to associate with the wireless network.

In Example 9, the subject matter of any of the Examples herein may further comprise a radio transceiver interfaced to the processing circuitry and configured to operate in a DMG band.

In Example 10, the subject matter of any of the Examples herein may further include a directional antenna array connected to the radio transceiver and operated by the processing circuitry to provide directional transmission and reception.

In Example 11, an apparatus for a wireless station device, comprises: memory and processing circuitry to configure the device to: communicate with other station devices over a directional multi-gigabit (DMG) band in a wireless network; wherein the processing circuitry is to configure the device to: receive a DMG beacon in discovery mode transmitted by a STA that is actively scanning; and, after responding to the DMG beacon during the association beamforming training (A-BFT) interval of the BI, receive a probe request from the STA that is actively scanning; and, if the probe request sent by the actively scanning STA contains a wildcard SSID, respond with a probe response containing an indication that the SSID of the wireless network is hidden to signal to the actively scanning STA that it should discontinue attempting to associate with the wireless network.

In Example 12, the subject matter of any of the Examples herein may further include wherein the indication contained in the probe response that the SSID is hidden is the wildcard SSID.

In Example 13, the subject matter of any of the Examples herein may further include wherein the processing circuitry is to, if the probe request sent by the actively scanning STA contains the hidden SSID, respond with a probe response that signals to the actively scanning STA that it should continue attempting to associate with the wireless network.

In Example 14, the subject matter of any of the Examples herein may further include wherein the processing circuitry is to, if the probe request sent by the actively scanning STA contains the hidden SSID, respond with a probe response that also contains the hidden SSID to signal to the actively scanning STA that it should continue attempting to associate with the wireless network.

In Example 15, an apparatus for a wireless station device, comprises: memory and processing circuitry to configure the device to communicate with other station devices over a directional multi-gigabit (DMG) band in a wireless network; wherein the processing circuitry is to: send a DMG beacon in discovery mode to an access point (AP); and, after receiving a response to the DMG beacon during the association beamforming training (A-BFT) interval of the beacon interval (BI), send a probe request to the AP with a wildcard service set identification (SSID); and, if the probe request is responded to with a probe response sent by the AP that contains an indication that the SSID of the wireless network is hidden, discontinue attempting to associate with the wireless network.

In Example 16, the subject matter of any of the Examples herein may further include wherein the indication contained in the probe response that the SSID is hidden is the wildcard SSID.

In Example 17, the subject matter of any of the Examples herein may further include wherein the processing circuitry is to: receive DMG beacons sent by the AP at periodic beacon intervals (BIs), wherein the DMG beacons do not include a service set identification (SSID) for the wireless network but do include an indication that the SSID is hidden; and, send a probe request to the AP only if the hidden SSID is known and discontinue attempting to associate to the wireless network otherwise.

In Example 18, the subject matter of any of the Examples herein may further include wherein the indication that the SSID is hidden is contained in an information element (IE) of the DMG beacon.

In Example 19, the subject matter of any of the Examples herein may further include wherein the indication that the SSID is hidden is contained in a control field of the DMG beacon.

In Example 20, the subject matter of any of the Examples herein may further include wherein the processing circuitry is to, if the hidden SSID is known, send the probe request with the hidden SSID contained therein.

In Example 21, a computer-readable medium contains instructions to cause a wireless station device (STA), upon execution of the instructions by processing circuitry of the STA, to perform any of the functions of the processing circuitry as recited by any of the Examples herein.

In Example 22, a method for operating a wireless station comprises performing any of the functions of the processing circuitry and/or radio transceiver as recited by any of the Examples herein The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the invention is not limited in this respect. An example LTE system includes a number of mobile stations, defined by the LTE specification as User Equipment (UE), communicating with a base station, defined by the LTE specifications as an eNodeB.

Antennas referred to herein may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to $\frac{1}{10}$ of a wavelength or more.

In some embodiments, a receiver as described herein may be configured to receive signals in accordance with specific communication standards, such as the Institute of Electrical and Electronics Engineers (IEEE) standards including IEEE 802.11-2007 and/or 802.11(n) standards and/or proposed specifications for WLANs, although the scope of the invention is not limited in this respect as they may also be suitable to transmit and/or receive communications in accordance with other techniques and standards. In some embodiments, the receiver may be configured to receive signals in accordance with the IEEE 802.16-2004, the IEEE 802.16(e) and/or IEEE 802.16(m) standards for wireless metropolitan area networks (WMANs) including variations and evolutions thereof, although the scope of the invention is not limited in this respect as they may also be suitable to transmit and/or receive communications in accordance with other techniques and standards. In some embodiments, the receiver may be configured to receive signals in accordance with the Universal Terrestrial Radio Access Network (UTRAN) LTE communication standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions. For more information with respect to UTRAN LTE standards, see the 3rd Generation Partnership Project (3GPP) standards for UTRAN-LTE, release 8, March 2008, including variations and evolutions thereof.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. An apparatus for a wireless station device, comprising:
   memory and processing circuitry to configure the device to communicate with other station devices (STAs) over a directional multi-gigabit (DMG) band in a wireless network;
   wherein the processing circuitry is to:
   encode DMG beacons to send to the other STAs at periodic beacon intervals (Ms); wherein the DMG beacons do not include a service set identification (SSID) for the wireless network but do include an indication that the SSID is hidden;
   complete initial beamforming (IBF) with one or more of the other STAs;
   respond with a probe response to a probe request sent by a STA after completion of IBF that includes the SSID of the wireless network; and,
   provide no response to a probe request sent by a STA after completion of IBF that does not include the SSID of the wireless network.

2. The apparatus of claim 1 wherein the indication that the SSID is hidden is contained in an information element (IE) of the DMG beacon.

3. The apparatus of claim 1 wherein the indication that the SSID is hidden is contained in a control field of the DMG beacon.

4. The apparatus of claim 1 wherein the processing circuitry is to configure the device to:
   receive a DMG beacon in discovery mode transmitted by a STA is actively scanning; and, after responding to the DMG beacon during an association beamforming training (A-BFT) interval of the BI, receive a probe request from the STA that is actively scanning.

5. The apparatus of claim 4 wherein the processing circuitry is to respond to a probe request sent by the actively scanning STA that contains a wildcard SSID with a probe response that also contains the wildcard SSID to signal to the actively scanning STA that it should discontinue attempting to associate with the wireless network.

6. The apparatus of claim 4 wherein the processing circuitry is to respond to a probe request sent by the actively scanning STA that contains a wildcard SSID with a probe response containing an indication that the SSID is hidden to signal to the actively scanning STA that it should discontinue attempting to associate with the wireless network.

7. The apparatus of claim 4 wherein the processing circuitry is to respond to a probe request sent by the actively scanning STA that contains the hidden SSID with a probe response that signals to the actively scanning STA that it should continue attempting to associate with the wireless network.

8. The apparatus of claim 4 wherein the processing circuitry is to respond to a probe request sent by the actively scanning STA that contains the hidden SSID with a probe response that also contains the hidden SSID to signal to the actively scanning STA that it should continue attempting to associate with the wireless network.

9. The apparatus of claim 1 further comprising a radio transceiver interfaced to the processing circuitry and configured to operate in a DMG band.

10. The apparatus of claim 9 further comprising a directional antenna array connected to the radio transceiver and operated by the processing circuitry to provide directional transmission and reception.

11. A non-transitory computer-readable medium comprising instructions to cause a wireless station device (STA), upon execution of the instructions by processing circuitry of the STA, to:

operate as an access point (AP) and send DMG (directional multi-gigabit) beacons to other STAs at periodic beacon intervals (BIs), wherein the DMG beacons do not include a service set identification (SSID) for the wireless network but do include an indication that the SSID is hidden;

complete initial beamforming (IBF) with one or more of the other STAs;

respond with a probe response to a probe request sent by a STA after completion of IBF that includes the SSID of the wireless network; and, provide no response to a probe request sent by a STA after completion of IBF that does not include the SSID of the wireless network.

12. The medium of claim 11 wherein the indication that the SSID is hidden is contained in an information element (IE) of the DMG beacon.

13. The medium of claim 11 wherein the indication that the SSID is hidden is contained in a control field of the DMG beacon.

14. The medium of claim 11 further comprising instructions to:

receive a DMG beacon in discovery mode transmitted by a STA that is actively scanning; and, after responding to the DMG beacon during an association beamforming training (A-BFT) interval of the BI, receive a probe request from the STA that is actively scanning.

15. The medium of claim 14 further comprising instructions to respond to a probe request sent by the actively scanning STA contains a wildcard SSID with a probe response that also contains the wildcard SSID to signal to the actively scanning STA that it should discontinue attempting to associate with the wireless network.

* * * * *

UNITED STATES PATENT AND TRADEMARK OFFICE
CERTIFICATE OF CORRECTION

PATENT NO. : 10,057,357 B2
APPLICATION NO. : 15/087389
DATED : August 21, 2018
INVENTOR(S) : Levy et al.

Page 1 of 1

It is certified that error appears in the above-identified patent and that said Letters Patent is hereby corrected as shown below:

In Column 14, Line 46, in Claim 1, delete "(Ms);" and insert --(BIs),-- therefor In Column 14, Line 67, in Claim 4, after "STA", insert --that--

Signed and Sealed this
Nineteenth Day of January, 2021

Andrei Iancu
*Director of the United States Patent and Trademark Office*